(12) United States Patent
Arsenault et al.

(10) Patent No.: US 6,459,842 B1
(45) Date of Patent: Oct. 1, 2002

(54) PACKAGING SYSTEM FOR TWO-DIMENSIONAL OPTOELECTRONIC ARRAYS

(75) Inventors: Barry Arsenault, Burlington, MA (US); Jason Bundas, Merrimack, NH (US); Mani Sundaram, Nashua, NH (US); Rick Thompson, Amherst, NH (US); Alan Tobey, Billerica, MA (US); Richard Williams, Hollis, NH (US)

(73) Assignee: Teraconnect, Inc., Nashua, NH (US)

( * ) Notice: Subject to any disclaimer, the term of this patent is extended or adjusted under 35 U.S.C. 154(b) by 0 days.

(21) Appl. No.: 10/029,434

(22) Filed: Dec. 13, 2001

Related U.S. Application Data

(60) Provisional application No. 60/255,341, filed on Dec. 13, 2000.

(51) Int. Cl.[7] .................................................. G02B 6/00
(52) U.S. Cl. ........................ 385/134; 385/135; 385/14; 250/227.11
(58) Field of Search ................................ 385/134, 135, 385/14, 24, 136, 137, 138, 139, 88, 89–94; 250/227.11

(56) References Cited

U.S. PATENT DOCUMENTS

| | | | |
|---|---|---|---|
| 4,943,136 A | * 7/1990 | Popoff | 385/134 |
| 5,113,460 A | 5/1992 | Hakoun et al. | 385/39 |
| 5,192,278 A | 3/1993 | Hayes et al. | 606/15 |
| 5,263,108 A | 11/1993 | Kurokawa et al. | 385/89 |
| 5,327,517 A | 7/1994 | Yamada et al. | 385/37 |
| 5,359,687 A | 10/1994 | McFarland et al. | 385/49 |
| 5,469,526 A | 11/1995 | Rawlings | 385/135 |
| 5,535,036 A | 7/1996 | Grant | 359/163 |
| 5,579,426 A | 11/1996 | Li et al. | 385/88 |
| 5,625,734 A | 4/1997 | Thomas et al. | 385/88 |
| 5,631,988 A | 5/1997 | Swirhun et al. | 385/89 |
| 5,748,818 A | 5/1998 | Weiss et al. | 385/59 |
| 5,764,834 A | 6/1998 | Hultermans | 385/60 |
| 5,768,456 A | 6/1998 | Knapp et al. | 385/49 |
| 5,909,526 A | 6/1999 | Roth et al. | 385/78 |
| 5,943,459 A | 8/1999 | Hildebrand | 385/50 |
| 5,956,450 A | * 9/1999 | Stieb et al. | 385/135 |
| 6,091,874 A | 7/2000 | Higashi et al. | 385/130 |
| 6,097,871 A | 8/2000 | De Dobbelaere et al. | 385/129 |
| 6,219,480 B1 | 4/2001 | Cassarly et al. | 385/46 |
| 6,272,155 B1 | 8/2001 | Sekiguchi et al. | 372/6 |
| 6,296,400 B1 | 10/2001 | Uchiyama et al. | 385/94 |

FOREIGN PATENT DOCUMENTS

| | | |
|---|---|---|
| WO | WO 98/14813 | 4/1998 |
| WO | WO 01/46729 A1 | 6/2001 |

* cited by examiner

Primary Examiner—Phan T. H. Palmer
(74) Attorney, Agent, or Firm—Scott J. Asmus; Vernon C. Maine; Maine & Asmus

(57) ABSTRACT

The present invention features a packaging system for two-dimensional optoelectronic arrays. In one embodiment, the packaging includes a heat spreader, a housing with embedded electrical interconnections, a substrate including electrical contacts, an application specific integrated circuit (ASIC) including a hybridized array with vertical cavity surface emitting laser (VCSEL), detectors or both. The waveguide assembly includes a plurality of individual one-dimensional waveguides formed in waveguide sheets, wherein the waveguides match the array footprint on one end and a connector footprint on the other end.

17 Claims, 9 Drawing Sheets

PACKAGING SYSTEM FOR TWO-DIMENSIONAL OPTOELECTRONIC ARRAYS

CROSS REFERENCE TO RELATED APPLICATIONS

This application claims priority under 35 U.S.C. Section 119 from a U.S. Provisional Patent Application Ser. No. 60/255,341 filed on Dec. 13, 2000, which is incorporated herein by reference for all purposes. A related application entitled AN OPTICAL WAVEGUIDE ASSEMBLY FOR INTERFACING A TWO-DIMENSIONAL OPTOELECTRONIC ARRAY TO FIBER BUNDLES is filed concurrently with the present application on Dec. 13, 2001 and is incorporated by reference herein.

BACKGROUND OF THE INVENTION

1. Field of the Invention

The present invention relates to the optoelectronic connectivity and the interconnection of an optical array to fiber optic cables.

2. Background Art

As processing speed increase and technology improves, data is being transferred at very high rates. However, one problem with high rate data transfer is that each leg in the process must be capable of the high rate or a bottleneck occurs. This problem holds true for data transfer within an integrated circuit, from one chip to another, from one integrated circuit board to another, and from system to system.

In the field of high-speed communications tools, increasing data transmission rates has been hindered by the limitations posed by fiber optics connectivity. In particular, increasing transmission density is difficult because the number of data transmission lines that conventional packaging technologies can handle is limited and subject to significant short-comings.

Present fiber optic transmission lines typically have up to twelve channels. If one or more channels on a conventional fiber optic transmission line malfunctions, the entire line must be replaced to restore full functionality of the line. Not only is there an increased cost associated with the maintenance, but the downtime in service can be catastrophic. Thus, there is a dire need for a way to increase the reliability for fiber optic transmission lines.

Also in the prior art, conventional vertical cavity surface emitting lasers (VCSELs) are mounted separately from the microprocessor that drives the VCSEL. This additional interface and configuration reduces the efficiency of the VCSEL and integrates another interface that is prone to maintenance and manufacturing problems, especially with the very high number of input/output (I/O) connectors with small tolerances for error. Therefore is a need for a way to hybridize VCSELs onto a processor substrate to improve the efficiency and transmission rates of the VCSELS.

There have been attempts to address the mismatch problem between optical arrays and optical connectors, but they have met with limited success. In general, there are many optical coupling devices that provide connectivity between fiber optic cables and terminate optical fiber cables, such as U.S. Pat. No. 5,909,526. There are also schemes for connecting electro-optics that employ complex coordination and alignment problems such as U.S. Pat. No. 5,579,426. But, the prior art still does not address interconnecting to an industry standard connector. As a connector type is adopted and approved as a standard, manufacturers and designers rush to incorporate the connector type to allow standardization in the industry. Thus far there has been a mismatch between the optoelectronics array technology having high density channels and the means for effectively incorporating and utilizing the array technology.

One of the difficulties in the emerging optical marketplace is that the market rejects innovative technologies because they are not compatible with existing technology. It is therefore commercially advantageous to integrate new technologies with existing infrastructure in order to be commercially accepted and used.

Thus, there is a need to provide an efficient and industry acceptable packaging system. There is a also a need for a way to bend the light from one plane to another in a minimum turn radius in order to keep the headroom adequate for packaging considerations. In addition, there is also a need for a way to hybridize VCSELs onto a processor substrate to improve the efficiency and transmission rates of the VCSELS. Thus, there is a dire need for a way to increase the reliability for fiber optic transmission lines. What is needed is a method and apparatus for utilizing the advantages of optical technology and providing a mechanism to efficiently interconnect to industry standard connectors such that the electronics industry can fully exploit the bandwidth, speed and efficiency of optics.

SUMMARY OF THE INVENTION

The invention is devised in the light of the problems of the prior art described herein. Accordingly it is a general object of the present invention to provide a novel and useful technique that can solve the problems described herein.

In one embodiment, the invention features a packaging system for two-dimensional optoelectronic arrays. The packaging system includes a heat spreader, a ceramic housing with embedded electrical traces, a solderless land grid array (LGA) including electrical contacts, an application specific integrated circuit (ASIC) including hybridized vertical cavity surface emitting laser (VCSEL) or detectors, a waveguide assembly including twelve individual waveguides and a waveguide housing, and a 2×12 ferrule for optical transition.

In a second embodiment, the present invention features a method for packaging two-dimensional optoelectronic arrays. The packaging method is easily scalable to various optoelectronic array configurations.

An object of the invention is a packaging system for a two-dimensional optoelectronic array, comprising a substrate with electrical interconnections, an application specific integrated circuit (ASIC) including the optoelectronic array, wherein the ASIC is electrically connected to the substrate. There is a waveguide assembly providing a flexible interface to the optoelectronic array on a first end and one or more optical connectors on a second end, wherein the waveguide assembly has two or more one-dimensional waveguide sheets, wherein the waveguide sheets match a footprint of the optoelectronic array on the first end and match a footprint of the optical connectors on the second end.

Another object is the packaging system, wherein the optoelectronic array is comprised of vertical cavity surface emitting lasers or photodetectors.

An additional object is the packaging system, wherein the optical connectors are ferrules and the waveguide sheets are combined to match a channel arrangement of the ferrules.

In addition, the packaging system, further comprising a housing assembly affixed to a first side of the substrate, wherein the housing assembly contains the optoelectronic array.

Yet a further object includes the packaging system, further comprising electrical connections on the substrate, wherein the electrical connections are selected from the group comprising a solderless land grid array (LGA) and a ball grid array (BGA). Also, further comprising a thermally conducting plate affixed to a second side of the substrate, and further comprising electronic circuitry on the substrate.

Objects include the packaging system, wherein the substrate is selected from the group consisting of a ceramic material and a printed circuit board. And, the packaging system, further comprising a cover on the ASIC fitting into a recess of the housing.

Furthermore, the optical waveguide assembly, wherein the waveguides are bendable within the waveguide sheets.

An object of the invention is a low-profile optical assembly for interfacing a two-dimensional optoelectronic array to an optical connector, comprising a substrate with electrical interconnections, an application specific integrated circuit (ASIC) with an optoelectronic array, wherein the ASIC is electrically connected to the substrate. There are two or more flexible waveguide sheets, wherein each of the waveguide sheets has an array end and a connector end. A plurality of one-dimensional waveguides are in each of the waveguide sheets, wherein each of the waveguides has an array end pitch at the array end and a connector end pitch at the connector end, and wherein the array end pitch matches a pitch of the optoelectronic array and the connector end pitch matches a pitch of the optical connector. Furthermore a waveguide housing at the array end of the waveguide sheets is used for retaining the waveguide sheets and aligning the waveguide housing to the optoelectronic array, wherein each of the waveguide sheets has an array end spacing at the array end and a connector end spacing at the connector end, and wherein the array end spacing matches a spacing at the optoelectronic array and the connector end spacing matches a spacing at the optical connector.

Still other objects and advantages of the present invention will become readily apparent to those skilled in this art from the following detailed description, wherein we have shown and described only a preferred embodiment of the invention, simply by way of illustration of the best mode contemplated by us on carrying out our invention. As will be realized, the invention is capable of other and different embodiments, and its several details are capable of modifications in various obvious respects, all without departing from the invention.

BRIEF DESCRIPTION OF THE FIGURES

The present invention will be readily understood by the following detailed description in conjunction with the accompanying drawings, wherein like reference numerals designate like structural elements, and in which.

DESCRIPTION OF THE PREFERRED EMBODIMENT

Figure 1:
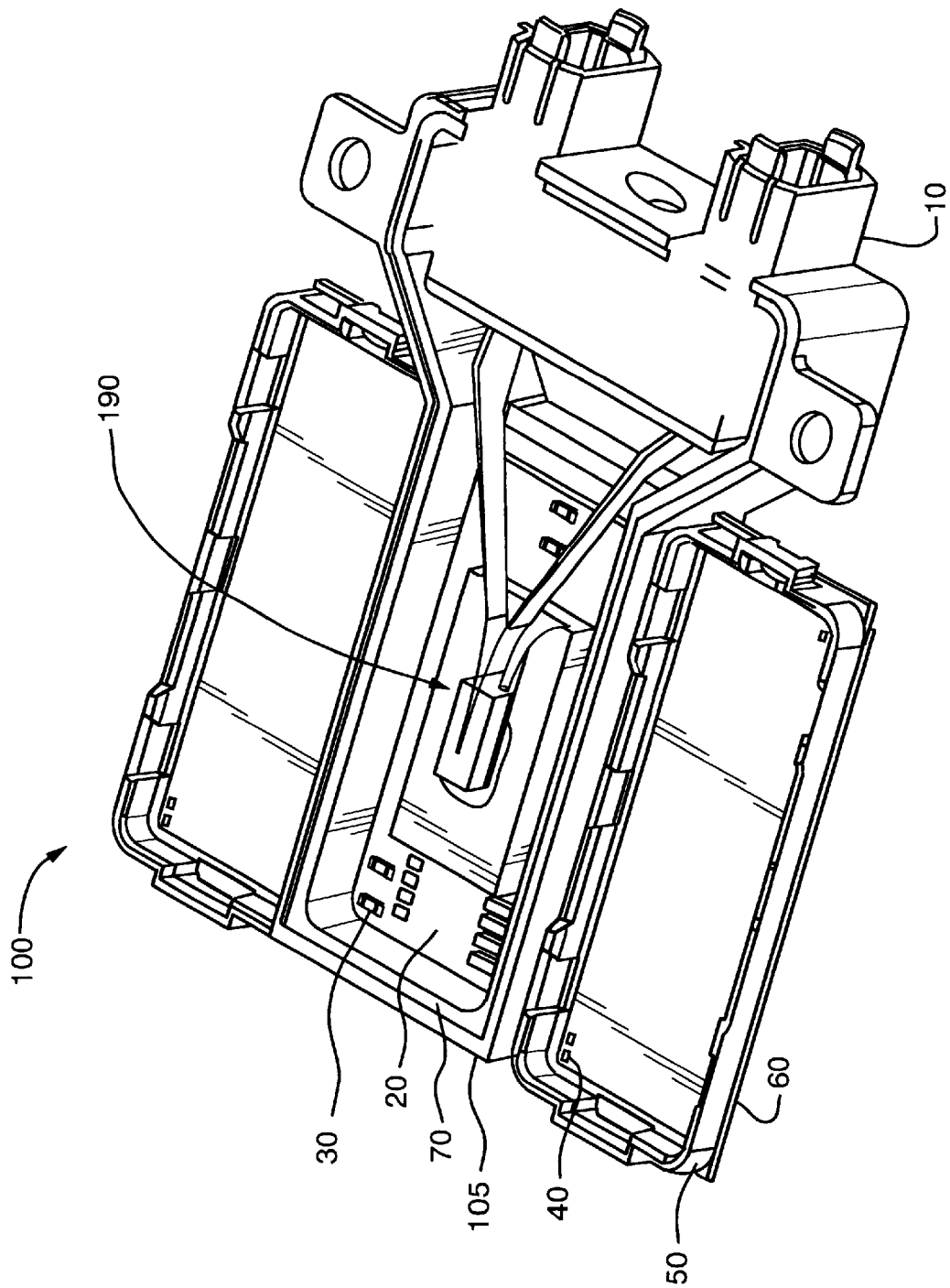
FIG. 1 is a top perspective view of the optoelectronic array assembly with the waveguide assembly mounted in the housing.

The present invention is a packaging system for two-dimensional optoelectronic arrays. One embodiment of the invention is shown in FIG. 1, which depicts the optoelectronic module 100 with the waveguide assembly 190 installed and allowing communication to standard optical connectors 10. The waveguide assembly 190 is nested within a printed circuit board 20 (PCB) and the housing 105 is affixed to the PCB by electrically conductive epoxy. Other securing means are possible, including the use of gaskets between the housing 105 and the PCB 20. The housing can be various materials, such as metal, plastic and ceramic depending upon cost considerations and the intended usage and environment. Various electronics 30 can be incorporated onto the PCB 20, and wherein the PCB is typically a multilayer board having integrated and/or mounted electronic devices and electrical connections integrated into the PCB or various surface interconnections. The additional electronics provides enhanced processing, storage and interfacing capabilities. On at least one side of the center housing 105 are an array of electrical contacts 40, which in one embodiment is for a ball grid array (BGA) connector that mates with the BGA housing 50.

On the underside of the PCB 20 is a thermally conductive substrate 60 that is affixed by an adhesive and dissipates and otherwise spreads the heat. A cover (not shown) is placed into the inner groove 70 of the center housing 105 and seals the center housing from the environment as well as provides electromagnetic interference (EMI) benefits.

Figure 2:
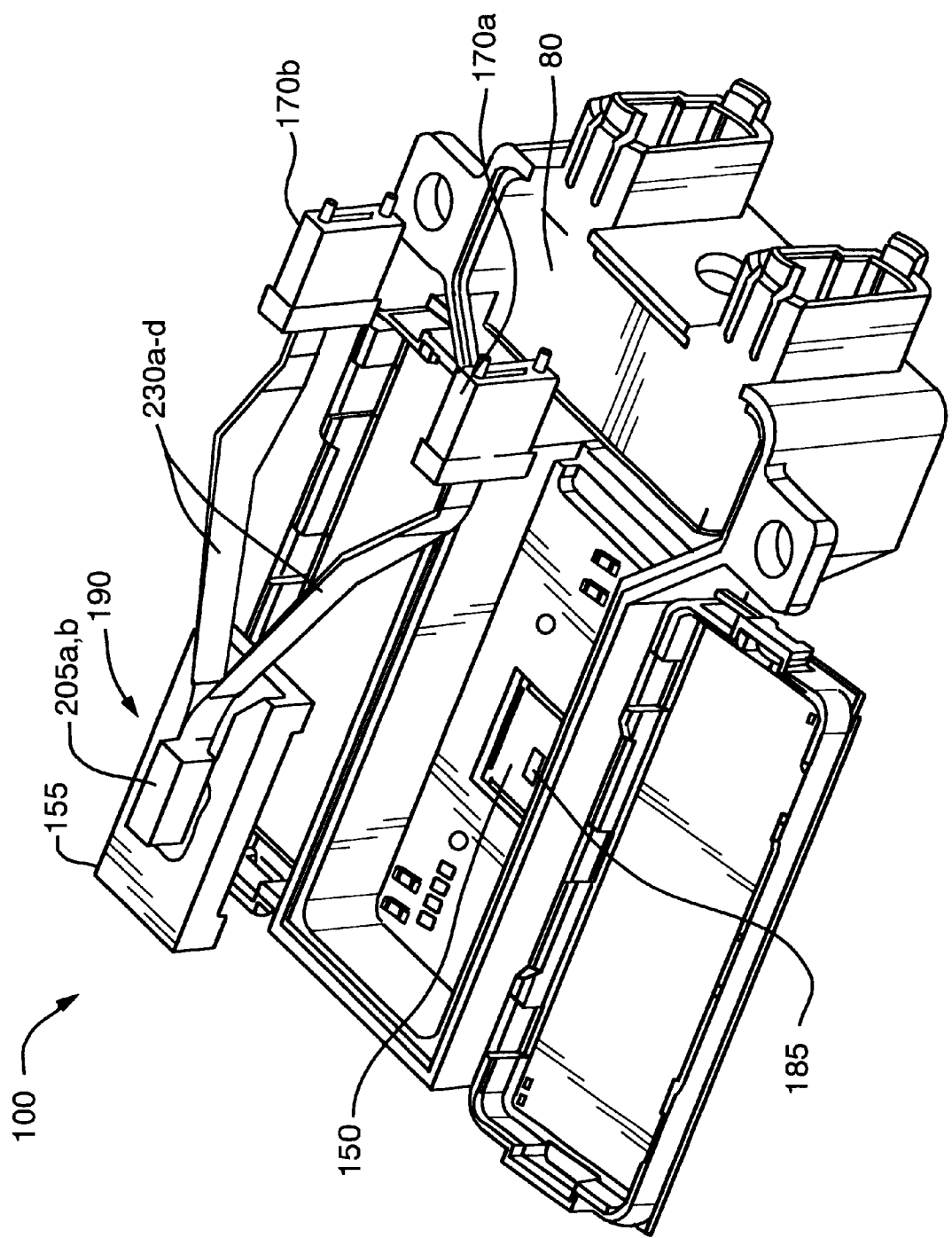
FIG. 2 is a top perspective view of an optoelectronic array assembly with the waveguide assembly displaced from the housing.

FIG. 2 shows the waveguide assembly 190 displaced from the application specific integrated circuit (ASIC) assembly 150 and the ferrules 170a,b withdrawn from the optical connector housing 10. The ferrules 170a,b are placed within the connector housing 10 by removing the connector plate 80, wherein the ferrules 170a,b are assembled to the housing 10. The waveguide assembly 190 secures to the ASIC assembly 150 wherein the anchor plate 155 engages the PCB 20 so that the optoelectronic array 185 is aligned to the matching optical channels retained in the waveguide housing 205a,b. The waveguide sheets 230a–d provide the flexible interface between the optoelectronic array 185 and the ferrules 170a,b. It should be readily apparent that the optoelectronic array 185 can be a vertical cavity surface emitting laser (VCSEL) array for transmitting photonic signals, photodetectors for receiving photonic signals, or a combination of both. For illustrative purposes, VCSELs are used in the description herein.

Figure 3:
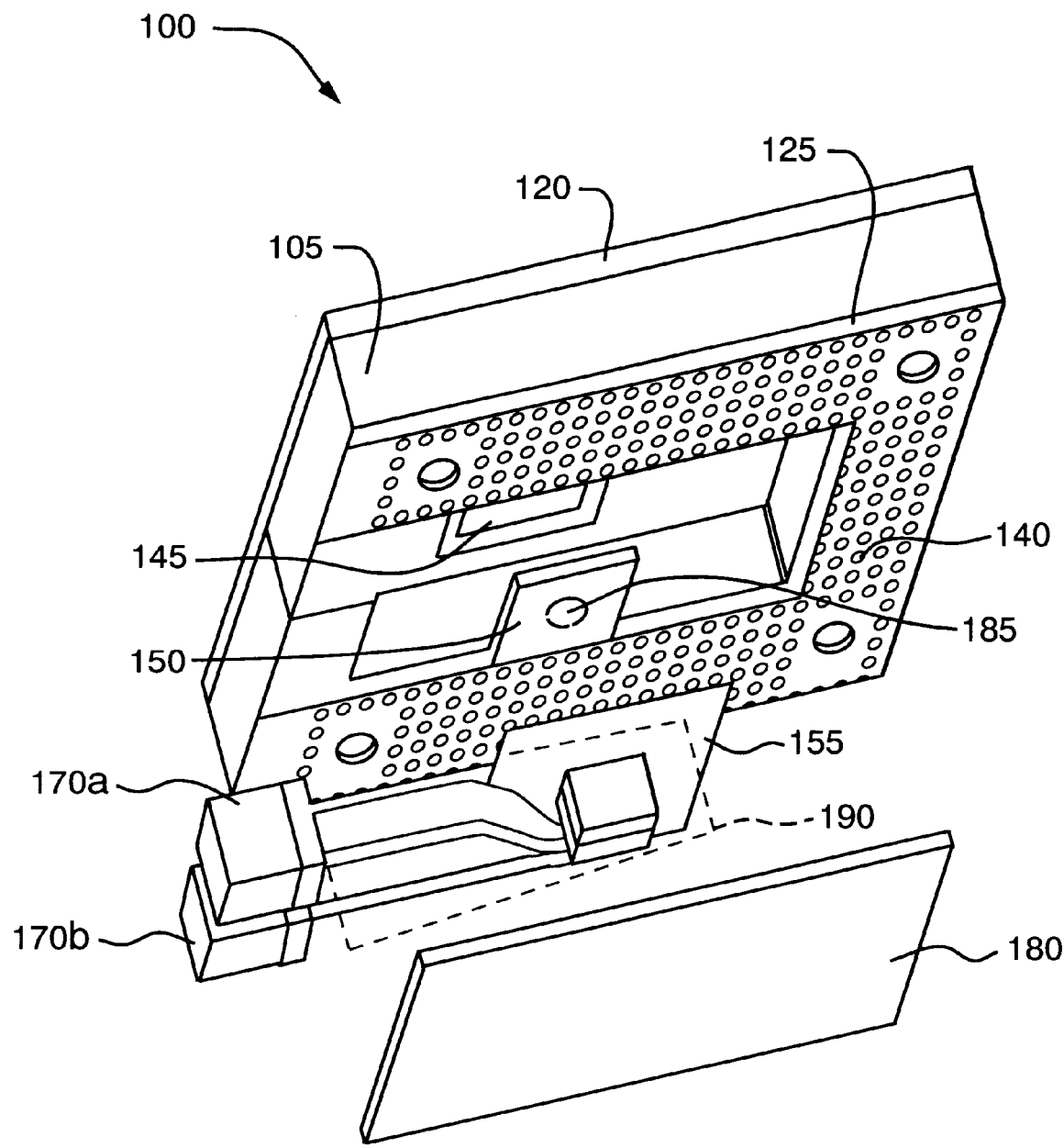
FIG. 3 is a perspective view of the optoelectronic array assembly with the waveguide assembly and bottom cover displaced from the housing.

A second embodiment is illustrated in FIG. 3, wherein the optoelectronic array assembly 100 includes a ceramic housing 105, a heat spreader 120 adhered to the ceramic housing 105. A solderless land grid array (LGA) 125 is electrically and physically connected to ceramic housing 105 and electrically connected to a printed wiring board (not shown). Bottom cover 180 is typically a non-conductive rectangular-shaped material, as shown in FIG. 3, and is adhered to ceramic housing 105 using conventional adhesion techniques. Bottom cover 180 may be either conductive or non-conductive material.

As shown in FIG. 3, heat spreader 120 is adhered to ceramic housing outer surface 130 using conventional epoxy. Further, ASIC 150 is nested in ASIC cavity 145 and is bonded to heat spreader 120 using thermally conductive epoxy and electrically connected to wire bond shelf 142 using gold wires. Heat spreader 120 provides a conductive path between ASIC 150 and a heat sink (not shown).

ASIC 150 is a conventional integrated circuit and is hybridized with a vertical cavity surface emitting laser (VCSEL) array 185. VCSEL array 185 includes VCSEL components arranged in a 12×n two-dimensional pattern as to allow 12×n signal channels to be processed by one ASIC 150.

Figure 4:
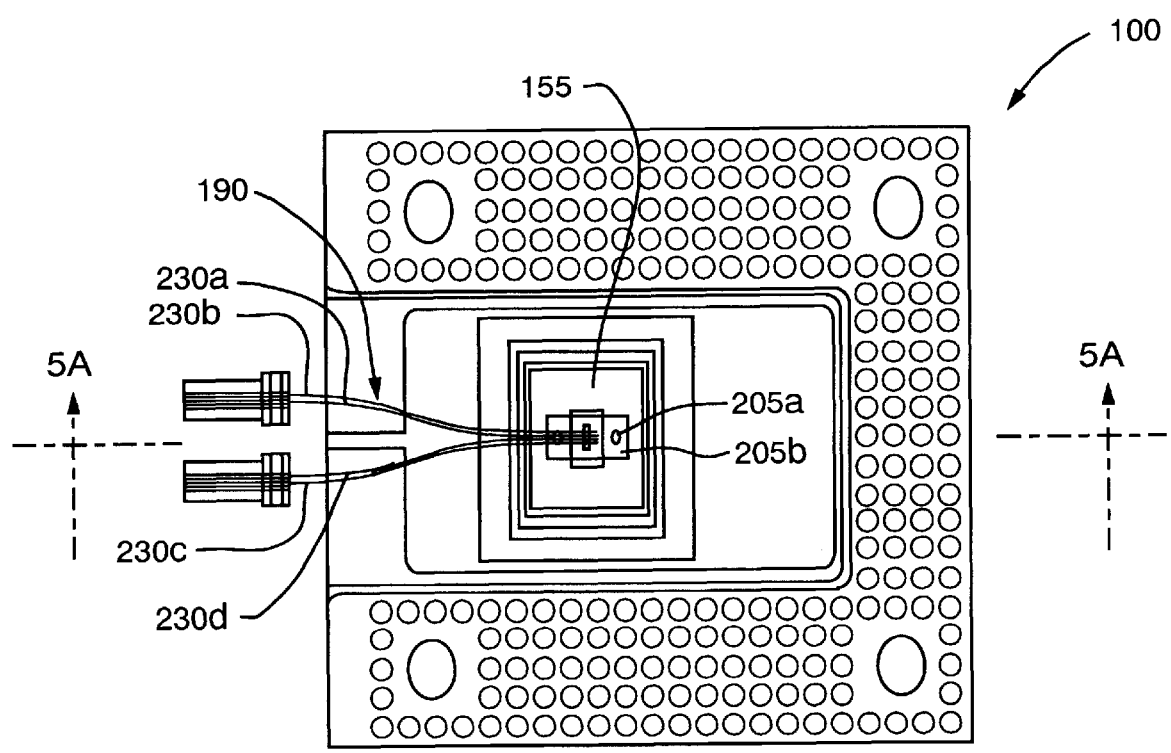
FIG. 4 is a bottom view perspective of the optoelectronic array assembly illustrating the orientation of the waveguide assembly, waveguide sheets and ferrules.

Referring to FIG. 4, waveguide assembly 190 includes waveguide housing members 205a and 205b representing opposing sides of the waveguide housing. Four waveguide sheets 230a–230d are sandwiched between the waveguide housing members 205a and 205b and are held together by an adhesive 151, shown in FIG. 5B. In one example, waveguide housing members 205a, 205b are made of injection molded plastic, and waveguide sheets 230a–230b are made of a polymer conventionally formed in a sheet.

Each waveguide sheet 230a–230d includes a 1×12 array of waveguides 171 formed on the waveguide sheets 230a–230d using a photolithography process. The waveguide technique uses sheets of plastic that are masked using semiconductor processing techniques that exposes light to form discrete fiber channels 171. The geometry and shape/design of each channel or waveguide 171 is tightly controlled as is known to those skilled in the art of photolithography. As this process is a dry processing, the plastic sheets are exposed to form the channels 171 and the waveguides are done without etching or farther processing. The waveguide sheets 230a–d are laminated and ready for use. The pitch and channel count for each sheet can be made to match the footprint on either end to whatever is needed at the respective interface. As the connector technology improves and the pitch and channel count changes, the waveguides 171 can be fabricated to match the connectors to any array.

Figure 5A:
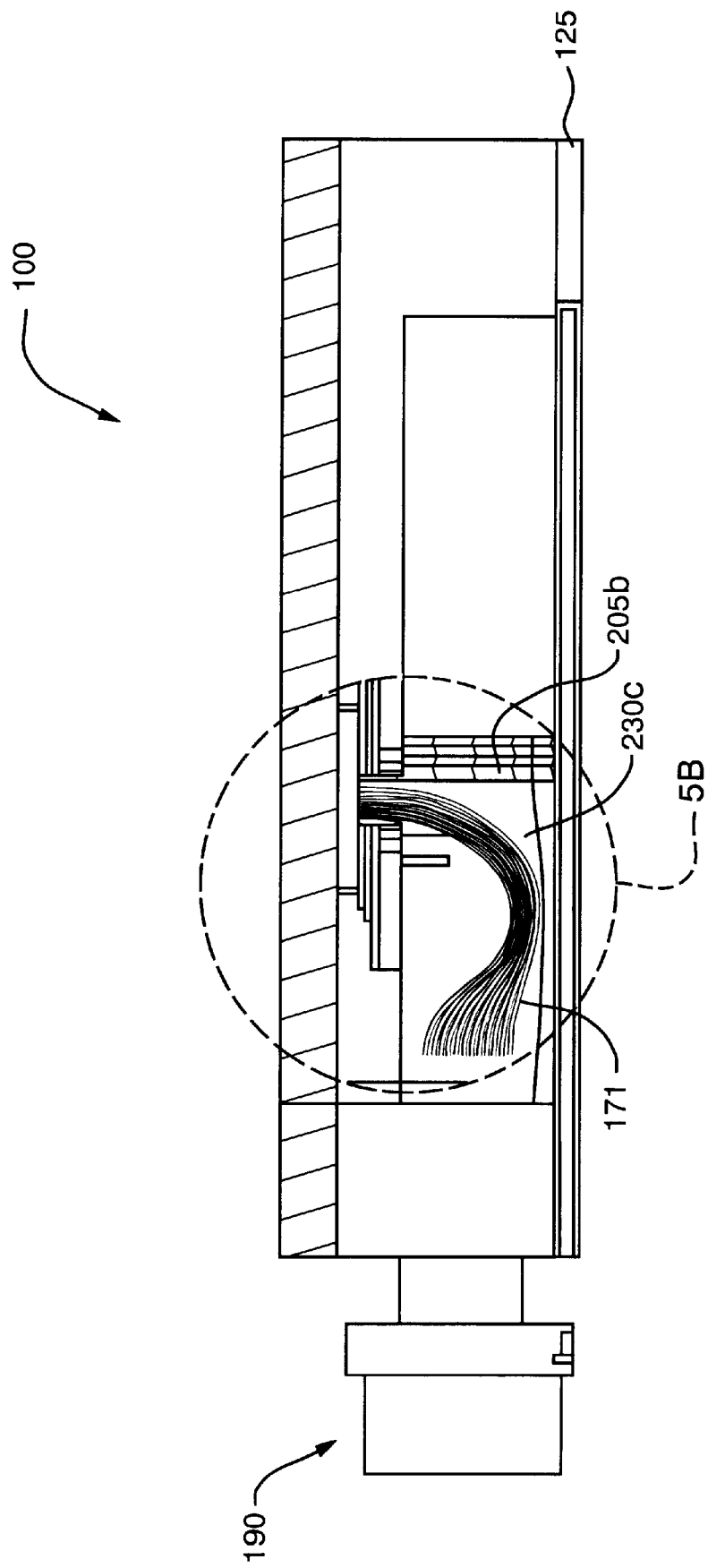
FIG. 5A is a cross-sectional side view of the optoelectronic array assembly showing the paths of the discrete channels of the waveguide sheet.
Figure 5B:
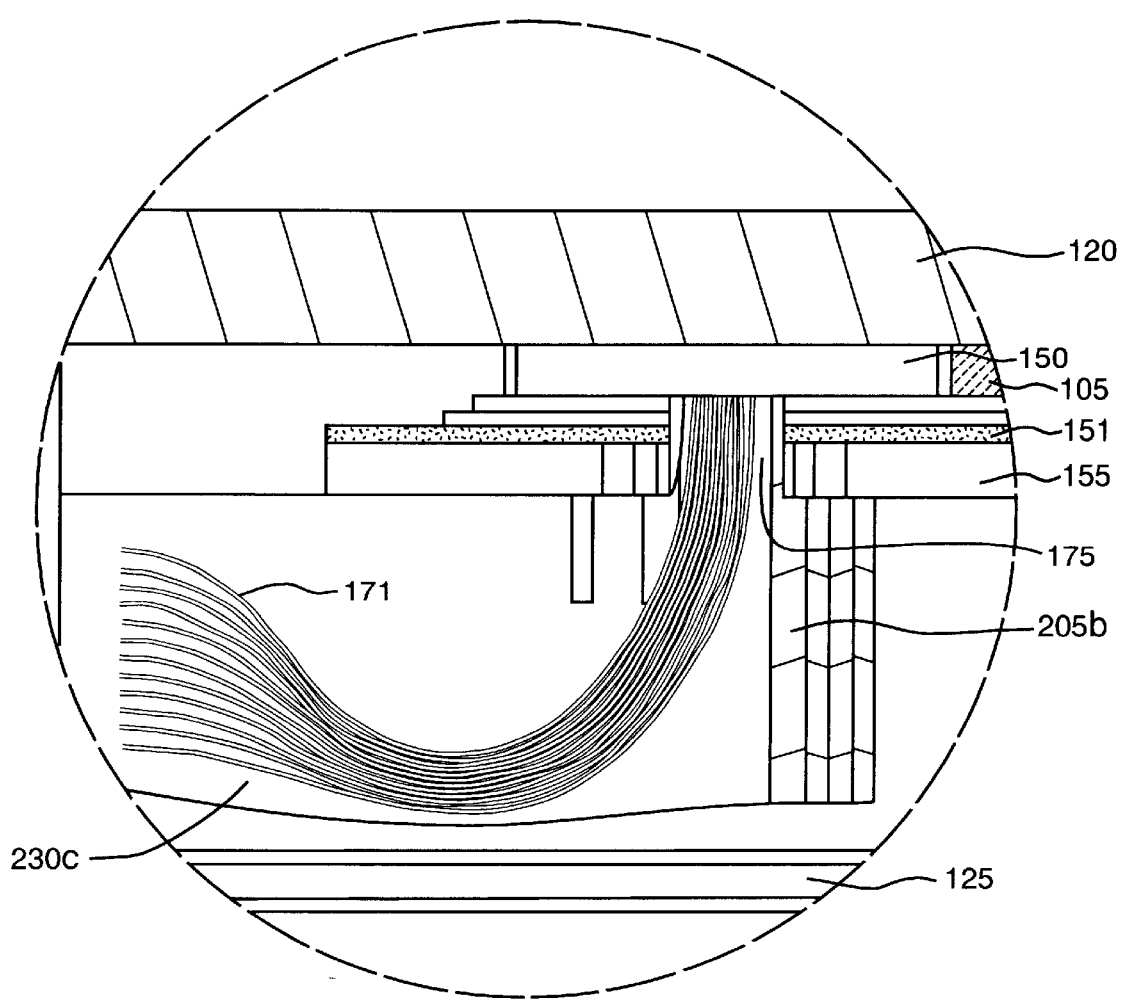
FIG. 5B is a detail exploded view of area A of FIG. 5A, further illustrating the path of the discrete channels and the varied pitch at the different connecting ends and the bend radius

Referring to FIG. 5A, waveguide assembly 190 includes a waveguide housing 205, which supports waveguides 171 and waveguide sheets 230a–d, and is functionally connected to anchor plate 155. As shown in FIG. 5B, anchor plate 155 supports waveguide assembly 190 and aligns the waveguides 171 over the VCSEL and thereby couples light into the waveguides 171. Once alignment has been attained, anchor plate 155 provides mechanical support and maintains alignment of the waveguides 171.

As illustrated in FIG. 5A and 5B, a waveguide sheet 230c is generally rectangular with a protruding section 175 that is used to extend the waveguides 171 beyond the plane of the anchor plate 155 to optically interconnect with the VCSEL array 185 within the ASIC 150. The waveguide housing 205a,b fits within a corresponding cut-out in the anchor plate 155 with the protrusion 175 having the waveguides 171 extending beyond the anchor plate 155 plane. The individual waveguides 171 are stamped/designed into the waveguide sheet 230c in the most efficient manner and match the pitch of the VCSEL array 185 on the protruding end 175 and also match the pitch at the ferrule 170 a,b connector end. The discrete waveguide channels 171 are curved to provide the 90 degree optical interconnect, however in the preferred embodiment the bend radius of the curve is designed to minimize losses. Likewise, the overall length of the waveguide sheet 230c is designed to minimize losses as is known in the art.

The optoelectronic assembly 100 can be a transmit or receive array assembly, and includes an application specific integrated circuit (ASIC) 150 bonded to the heat spreader 120, and a waveguide assembly 190 functionally connected to anchor plate 155 through the cut-out in the anchor plate 155. Embedded in ASIC 150 is the VCESL array 185. As shown in FIG. 5B, waveguide assembly 190 is positioned in a manner so a protrusion 175 of the waveguide sheets 230a–d goes through anchor plate 155 and aligns with the VCSEL array 185. The waveguide sheets 230a–d are retained by a waveguide housing 205a,b and fit within a cut-out of the anchor plate 155 so that the protrusion 175 extends beyond the plane of the anchor plate 155 so the waveguides 171 extend towards the VCSEL array 185 when connected.

Optoelectronic assembly 100 also includes 2×12 ferrules 170a,b optically connected to the waveguide assembly 190 and a bottom cover 180, which is adhered to ceramic housing 105. The 2×12 ferrules 170a,b are the present industry standard, so the present invention therefore permits any size array to be subdivided to match the present standard optical connectors. It should be obvious to those skilled in the art that the inventive subject matter is not limited to 2×12 ferrules and as the technology improves and the channel count increases, the present system can be easily tailored to new standard connectors or customized to a specific design interface.

Ferrules 170a,b are conventional 2×12(2 rows of 12 waveguide connections) ferrules and allows for optical transition from the waveguide assembly 190 to standard optical ribbon fibers (not shown). As noted herein, as the technology improves other connectors with increased channel capacity are expected and the present invention is easily adapted to increased channels.

The VCSEL array of the ASIC assembly 150 is placed within the ASIC cavity 145 and the anchor plate 155 of the waveguide assembly 190 is aligned and matched to the ASIC 150 with the VCSEL array 185 aligned to the corresponding channels of the waveguide assembly 190. The plurality of electrical contacts 140 on the periphery of the housing allow mating to electrical connectors and input/output (I/O) signals. The LGA 125 is mounted to the ceramic housing 105 with thermally conductive heat spreader 120 adhered to the opposing side of the ceramic housing 105.

Ceramic housing 105 is a conventional ceramic housing and further includes a ceramic housing top surface, a ceramic housing bottom surface, and a ceramic housing inner surface. Ceramic housing inner surface further includes an ASIC cavity 145, which is a shaped cutout in ceramic housing 105 as to match the x/y dimensions of ASIC 150, as shown in FIG. 3. Additionally, wire bond shelves are formed in ASIC cavity 145 form a perimeter around ASIC cavity 145 providing an ASIC 150 to ceramic housing 105 electrical interconnect. Ceramic housing inner surface also acts to support waveguide assembly 190.

Solderless land grid array (LGA) 125 is an integral package interconnect that provides electrical continuity between the ceramic housing 105 bottom surface and printed wiring board (not shown). Solderless LGA 125 is a compression interconnect containing an array of electrical contacts 140. Further, ceramic housing 105 bottom surface forms electrical contact with the solderless LGA 125 top surface. Solderless LGA 125 bottom surface is electrically connected to printed wiring board (not shown).

Figure 6:
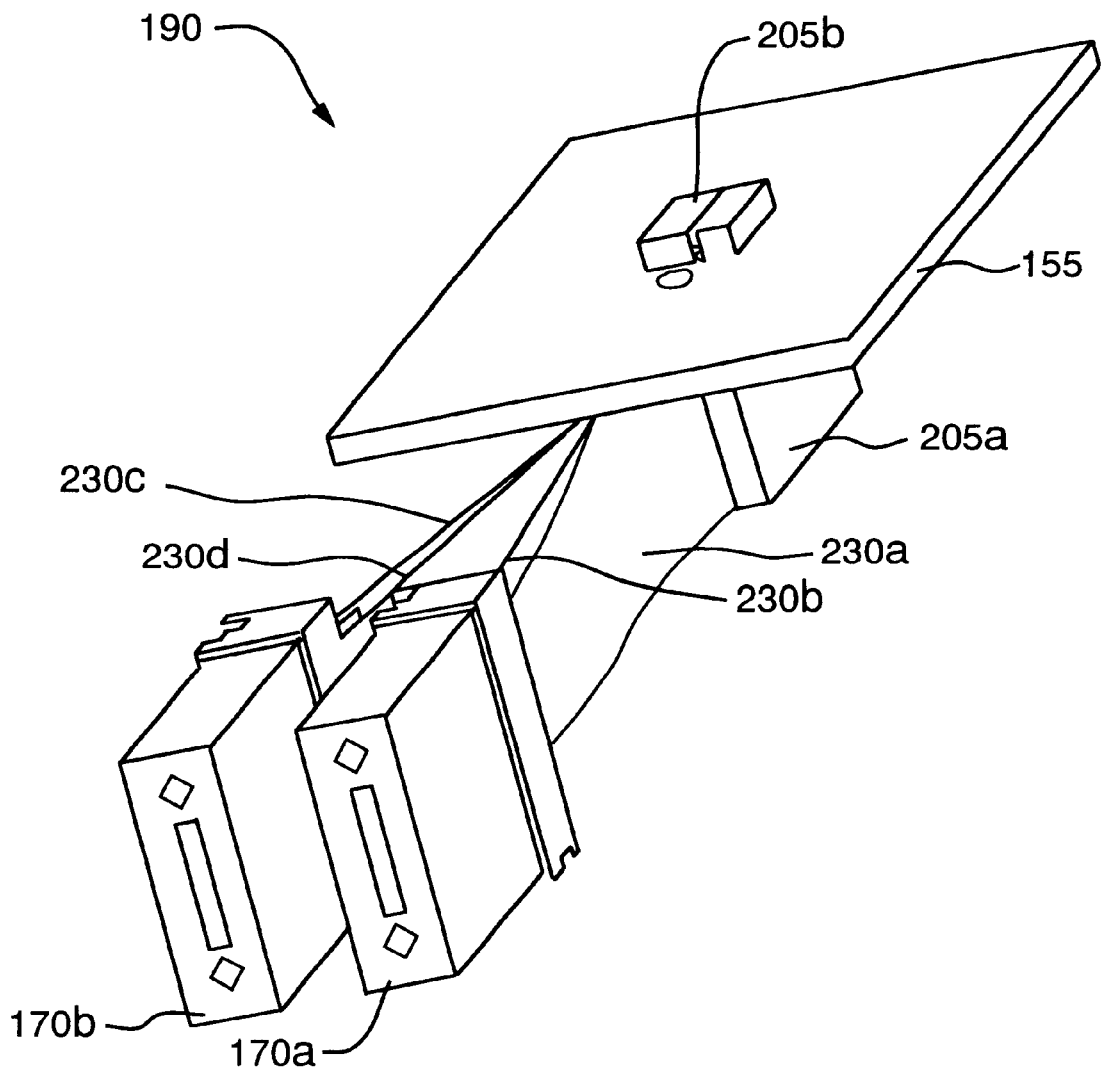
FIG. 6 is a perspective view of the waveguide assembly showing the placement of the waveguide housing within the anchor plate and the connection of the ferrules to the waveguide sheets.

FIG. 6 shows a perspective view of the waveguide assembly 190 of the present invention. Waveguide assembly 190 includes two 2×12 ferrules 170a, 170b fed by waveguide sheets 230a–230d. The protruding section of the waveguide sheet 175 extends the optical channels (not shown) from the waveguide housing 205a, 205b through the anchor plate 155 so that they will be in close communication when mated to the housing and optically communication with the VCSEL array. In this example, a stack of four waveguide sheets 230a–230d (each having a 1×12 array of waveguides 171) are assembled to create a 4×12 array of waveguides 171. The 48 waveguides 171 of waveguide assembly 190 connect to two 2×12ferrules 170a×170b. Each 2×12ferrule 170a and 170b is fed by two waveguide sheets 230a, 230b and 230c, 230d, respectively.

Figure 7:
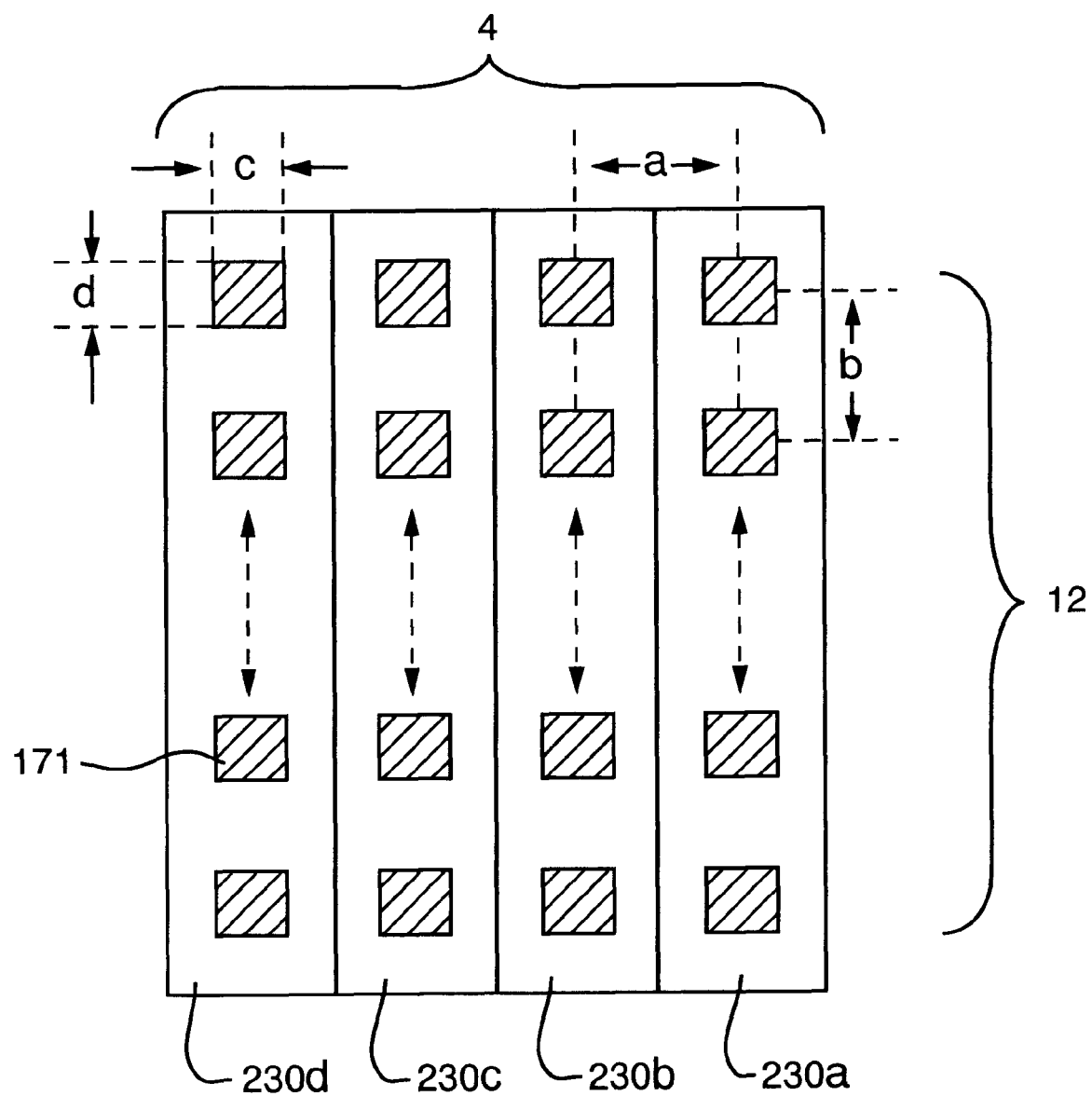
FIG. 7 is an end view of a stack of four waveguide sheets 4×12 showing the pitch and spacing dimensions for matching the footprint of the VCSEL array

FIG. 7 is an end view on the ASIC side of a stack of four waveguide sheets 230a–230d creating a 4×12 array of waveguides 171. The 4×12 array of FIG. 7 is aligned with ASIC 150 and held in position with anchor plate 155 in combination with waveguide housing members 205a, 205b. It is important to note that waveguide assembly 190 is not limited to a stack of four waveguide sheets 230a–230d. In alternative embodiments, any number of waveguide sheets may be stacked.

Figure 8:
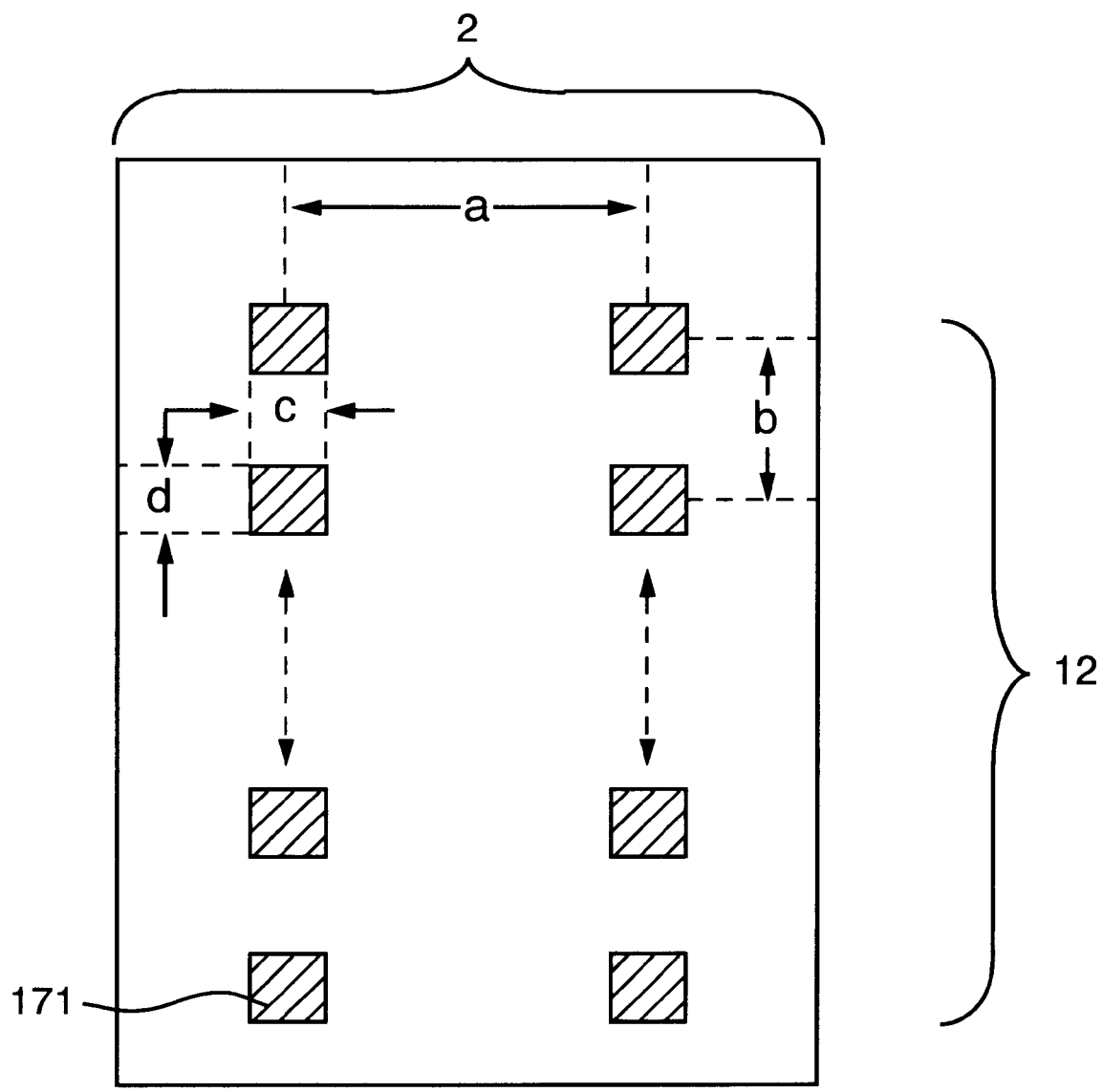
FIG. 8 is a detailed end view of a 2×12 ferrule showing the pitch and spacing dimensions for matching the footprint of the optical connector

FIG. 8 shows a detailed end view of a 2×12ferrule 170a containing a 2×12array of waveguides 171 on a different pitch as compared with FIG. 7. Standard 2×12 ferrule 170a allows waveguide assembly 190 to mate to conventional fiber optic connectors by employing the flexible waveguides 171 of the waveguide assembly's 230a–d.

Waveguide assembly 190 of the present invention allows a pitch transition from the optoelectronic array embedded in ASIC 150 to a standard pitch of 2×12ferrules 170a, 170b. Table 1 below shows an example of the waveguide array dimensions.

The various pitch dimensions and waveguide sizes are shown as a–d as follows:
   a—pitch dimension between waveguide sheets (row spacing)
   b—pitch spacing between individual waveguides in the column of the waveguide sheet
   c—the horizontal or 'x' plane dimension of the waveguide
   d—the vertical or 'y' plane dimension of the waveguide
In a preferred embodiment, the dimensions of the various ends of the waveguide as shown in Table 1.

TABLE 1

|  | a | b | c | d |
|---|---|---|---|---|
| FIG. 7: ASIC side of waveguide sheet 230 (stacked array) | 125 μm | 125 μm | 30–50 μm | 30–50 μm |
| FIG. 8: 2 × 12 ferrule 170 array | 500 μm | 250 μm | 30–50 μm | 30–50 μm |

In one example, each waveguide 171 of waveguide sheet 230a–d is 30 to 50 μm square in cross-section, and between 3 and 5 cm long. It is desirable to minimize the length of each waveguide 171 to avoid excessive light loss. As discussed, the spacing between the waveguides 171 is defined as pi and can be varied at either end of the waveguide sheet for the waveguide column spacing, and the dimension between waveguide sheets establishes the row pitch or row spacing. The waveguide assembly 190 allows a pitch transition from the pitch of the optoelectronic array embedded in ASIC 150 to a different pitch of the 2×12 ferrule 170a as well as matching the row spacing. This feature permits the present invention to be used with legacy systems and allows an interface between an optoelectronic array having any density or pitch to a standard connector.

In one example, the 30 to 50 μm square cross-sections of waveguides 171 are suitably sized to interface with a standard fiber having a core diameter of 62.5 μm. In alternative embodiments, other geometries are possible. The ability to provide a low headroom 90 degree bend also provides significant advantages heretofore unknown. As shown in FIG. 5B, the bend radius is preferably has a small bending radius, as more severe curves increase the loss in the line.

In operation, transmit assembly 100 is mounted to circuit card (not shown) in a fashion as to form electrical contact between contacts 140 and circuit card. User's initiated signal propagates through solderless LGA 125 bottom surface, middle, and top surface via electrical contacts 140 and associated wiring (not shown). The signal propagates, via conductive traces, through ceramic housing 105 to a point incident upon ASIC 150 wirebonds (not shown). The ASIC 150 processes the incoming signal and energizes the appropriate VCSELS in the VCSEL array 185 causing light emissions. VCSEL array 185 emits photon pulses corresponding to signal information through ASIC 150 to specified waveguides 171.

In an alternate embodiment of the invention, the VCSEL array is replaced with a detector array. Photon pulses are received by detector via waveguides 171. ASIC 150 processes the incoming signal from the detector and transmits electronic signal via wiring circuits to a point incident upon electrical contact 140. This electronic signal propagates through electrical contacts 140 to a point incident upon circuit card (not shown).

One advantage of the present invention is that it eliminates soldering of the electrical interface. A second advantage of the present invention is that it increases bandwidth for fiber optic communications. A third advantage of the present invention is that it is easily scalable to various optoelectronic array configurations. A fourth advantage of the present invention is that it can be used with existing legacy systems.

Numerous characteristics and advantages have been set forth in the foregoing description, together with details of structures and functions of critical race control, and the novel features thereof are pointed out in appended claims. The disclosure, however, is illustrative only, and changes may be made in arrangement and details, within the principle of the invention, to the full extent indicated by the broad general meaning of the terms in which the appended claims are expressed.

The objects and advantages of the invention may be further realized and attained by means of the instrumentalities and combinations particularly pointed out in the appended claims. Accordingly, the drawing and description are to be regarded as illustrative in nature, and not as restrictive.

What is claimed is:

1. A packaging system for a two-dimensional optoelectronic array, comprising:
   a substrate with electrical interconnections;

an application specific integrated circuit (ASIC) including said optoelectronic array, wherein said ASIC is electrically connected to said substrate;

a waveguide assembly providing a flexible interface to said optoelectronic array on a first end and one or more optical connectors on a second end, wherein said waveguide assembly has two or more one-dimensional waveguide sheets, wherein said waveguide sheets match a footprint of said optoelectronic array on said first end and match a footprint of said optical connectors on said second end.

2. The packaging system according to claim 1, wherein said optoelectronic array is comprised of vertical cavity surface emitting lasers.

3. The packaging system according to claim 1, wherein said optoelectronic array is comprised of photodetectors.

4. The packaging system according to claim 1, wherein said optical connectors are ferrules and said waveguide sheets are combined to match a channel arrangement of said ferrules.

5. The packaging system according to claim 1, further comprising a housing assembly affixed to a first side of said substrate, wherein said housing assembly contains said optoelectronic array.

6. The packaging system according to claim 5, further comprising a cover over said ASIC fitting into a recess of said housing.

7. The packaging system according to claim 1, further comprising electrical connections on said substrate, wherein said electrical connections are selected from the group comprising a solderless land grid array (LGA) and a ball grid array (BGA).

8. The packaging system according to claim 1, further comprising a thermally conducting plate affixed to a second side of said substrate.

9. The packaging system according to claim 1, further comprising electronic circuitry on said substrate.

10. The packaging system according to claim 1, wherein said substrate is selected from the group consisting of a ceramic material and a printed circuit board.

11. The packaging system according to claim 1, wherein said waveguides are bendable within said waveguide sheets.

12. A low-profile optical assembly for interfacing a two-dimensional optoelectronic array to an optical connector, comprising:

a substrate with electrical interconnections;

an application specific integrated circuit (ASIC) with an optoelectronic array, wherein said ASIC is electrically connected to said substrate;

two or more flexible waveguide sheets, wherein each of said waveguide sheets has an array end and a connector end;

a plurality of one-dimensional waveguides in each of said waveguide sheets, wherein each of said waveguides has an array end pitch at said array end and a connector end pitch at said connector end, and wherein said array end pitch matches a pitch of said optoelectronic array and said connector end pitch matches a pitch of said optical connector; and a waveguide housing at said array end of said waveguide sheets for retaining said waveguide sheets and aligning said waveguide housing to said optoelectronic array, wherein each of said waveguide sheets has an array end spacing at said array end and a connector end spacing at said connector end, and wherein said array end spacing matches a spacing at said optoelectronic array and said connector end spacing matches a spacing at said optical connector.

13. The low-profile optical assembly according to claim 12, further comprising an anchor plate that interconnects with said waveguide housing.

14. The low-profile optical assembly according to claim 12, said waveguide sheets being generally rectangular and having a protrusion, wherein said waveguides terminate at said protrusion.

15. The low-profile optical assembly according to claim 12, wherein said waveguide sheets are grouped at said connector end to connect to one or more ferrules.

16. The low-profile optical assembly according to claim 12, wherein said waveguides are bendable within said waveguide sheets.

17. The low-profile optical assembly according to claim 12, further comprising electrical connections on said substrate, wherein said electrical connections are selected from the group comprising a solderless land grid array (LGA) and a ball grid array (BGA).

* * * * *